(12) United States Patent
Alam et al.

(10) Patent No.: US 11,975,734 B2
(45) Date of Patent: May 7, 2024

(54) AUGMENTED-REALITY MAP ASSISTANCE TO IMPROVE DRIVER VISIBILITY

(71) Applicant: AT&T Intellectual Property I, L.P., Atlanta, GA (US)

(72) Inventors: Iftekhar Alam, Roswell, GA (US); Wasib Khallil, Lilburn, GA (US); Jonathan Chang, Atlanta, GA (US); Bhumit Patel, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 73 days.

(21) Appl. No.: 17/822,004

(22) Filed: Aug. 24, 2022

(65) Prior Publication Data

US 2024/0067199 A1 Feb. 29, 2024

(51) Int. Cl.
*G08G 1/09* (2006.01)
*B60K 35/00* (2006.01)
*B60W 40/02* (2006.01)
*B60W 50/14* (2020.01)

(52) U.S. Cl.
CPC ............. *B60W 50/14* (2013.01); *B60K 35/00* (2013.01); *B60W 40/02* (2013.01); *B60K 2370/177* (2019.05); *B60K 2370/1868* (2019.05); *B60K 2370/193* (2019.05); *B60W 2050/146* (2013.01); *B60W 2555/20* (2020.02); *B60W 2556/10* (2020.02); *B60W 2556/15* (2020.02); *B60W 2556/40* (2020.02); *B60W 2556/65* (2020.02)

(58) Field of Classification Search
CPC ................. B60W 50/14; B60W 40/02; B60W 2050/146; B60W 2555/20; B60W 2556/10; B60W 2556/15; B60W 2556/40; B60W 2556/65; B60K 35/00; B60K 2370/177; B60K 2370/1868; B60K 2370/193
USPC .......................................................... 340/905
See application file for complete search history.

(56) References Cited

U.S. PATENT DOCUMENTS

| | | | |
|---|---|---|---|
| 2015/0019266 A1* | 1/2015 | Stempora | G06Q 40/08 705/4 |
| 2018/0022354 A1* | 1/2018 | Akatsuka | B62D 15/026 701/41 |
| 2019/0344801 A1* | 11/2019 | Ishii | B60W 30/18 |
| 2021/0150904 A1* | 5/2021 | Nagata | B60Q 9/008 |

* cited by examiner

*Primary Examiner* — Tai T Nguyen (57) ABSTRACT

A method includes monitoring environmental conditions surrounding a moving vehicle, using an on-board sensor of the moving vehicle, detecting that at least one of the environmental conditions surrounding the moving vehicle is likely to impair visibility for a driver of the moving vehicle, based on an output of the on-board sensor, acquiring static map data for a location surrounding the moving vehicle, acquiring real time sensor data for the location surrounding the moving vehicle, where the real time sensor data comprises outputs of a plurality of on-board sensors of a plurality of other vehicles, generating an augmented reality view of the location surrounding the moving vehicle, using the static map data, the real time sensor data, and the output of the on-board sensor, and displaying the augmented reality view of the location surrounding the moving vehicle on a display within the moving vehicle.

20 Claims, 5 Drawing Sheets

AUGMENTED-REALITY MAP ASSISTANCE TO IMPROVE DRIVER VISIBILITY

The present disclosure relates generally to augmented reality, and relates more particularly to systems, non-transitory computer-readable media, and methods for generating augmented reality maps to assist drivers in navigating driving conditions in which the drivers' visibility may be impaired.

BACKGROUND

Augmented reality (AR) is a specific instance of extended reality technology in which computer-generated virtual objects may be inserted into a view of a real world environment. For instance, a computer generated overlay may be superimposed over an image of a real world environment in order to present an AR experience. Thus, AR may be used to provide immersive entertainment experiences (e.g., gaming, movies, or the like), to simulate conditions for training exercises (e.g., for emergency responders, medical personnel, or the like), to improve e-commerce experiences (e.g., by enabling shoppers to customize items and view those items under different conditions), and to enhance other applications.

SUMMARY

The present disclosure describes a device, computer-readable medium, and method for generating augmented reality maps to assist drivers in navigating driving conditions in which the drivers' visibility may be impaired. A method performed by a processing system including at least one processor includes monitoring environmental conditions surrounding a moving vehicle, using an on-board sensor of the moving vehicle, detecting that at least one of the environmental conditions surrounding the moving vehicle is likely to impair visibility for a driver of the moving vehicle, based on an output of the on-board sensor, acquiring static map data for a location surrounding the moving vehicle, acquiring real time sensor data for the location surrounding the moving vehicle, where the real time sensor data comprises outputs of a plurality of on-board sensors of a plurality of other vehicles, generating an augmented reality view of the location surrounding the moving vehicle, using the static map data, the real time sensor data, and the output of the on-board sensor, and displaying the augmented reality view of the location surrounding the moving vehicle on a display within the moving vehicle.

In another example, a non-transitory computer-readable storage medium stores instructions which, when executed by a processing system including at least one processor, cause the processing system to perform operations. The operations include monitoring environmental conditions surrounding a moving vehicle, using an on-board sensor of the moving vehicle, detecting that at least one of the environmental conditions surrounding the moving vehicle is likely to impair visibility for a driver of the moving vehicle, based on an output of the on-board sensor, acquiring static map data for a location surrounding the moving vehicle, acquiring real time sensor data for the location surrounding the moving vehicle, where the real time sensor data comprises outputs of a plurality of on-board sensors of a plurality of other vehicles, generating an augmented reality view of the location surrounding the moving vehicle, using the static map data, the real time sensor data, and the output of the on-board sensor, and displaying the augmented reality view of the location surrounding the moving vehicle on a display within the moving vehicle.

In another example, a system includes a processing system including at least one processor and a non-transitory computer-readable storage medium storing instructions which, when executed by the processing system, cause the processing system to perform operations. The operations include monitoring environmental conditions surrounding a moving vehicle, using an on-board sensor of the moving vehicle, detecting that at least one of the environmental conditions surrounding the moving vehicle is likely to impair visibility for a driver of the moving vehicle, based on an output of the on-board sensor, acquiring static map data for a location surrounding the moving vehicle, acquiring real time sensor data for the location surrounding the moving vehicle, where the real time sensor data comprises outputs of a plurality of on-board sensors of a plurality of other vehicles, generating an augmented reality view of a location surrounding the moving vehicle, using the static map data, the real time sensor data, and the output of the on-board sensor, and displaying the augmented reality view of the location surrounding the moving vehicle on a display within the moving vehicle.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides systems, non-transitory computer-readable media, and methods for generating augmented reality maps to assist drivers in navigating driving conditions in which the drivers' visibility may be impaired. As discussed above, augmented reality (AR) is a specific instance of extended reality technology in which computer-generated virtual objects may be inserted into a view of a real world environment. For instance, a computer generated overlay may be superimposed over an image of a real world environment in order to present an AR experience. Thus, AR may be used to provide immersive entertainment experiences (e.g., gaming, movies, or the like), to simulate conditions for training exercises (e.g., for emergency responders, medical personnel, or the like), to improve e-commerce experiences (e.g., by enabling shoppers to customize items and view those items under different conditions), and to enhance other applications.

Examples of the present disclosure use AR technology to assist drivers during hazardous driving conditions in which the drivers' visibility may be impaired. For instance, weather events such as rain, snow, sleet, and fog, and other environmental conditions such as smoke, heavy vehicle exhaust, and road obstructions may impair driver visibility and create a safety hazard. In one example of the present disclosure, an AR map of the environment surrounding a moving vehicle may be generated and displayed on an in-vehicle display (e.g., a heads up display, a dashboard display, an AR-enabled windshield, or the like) when the environmental conditions surrounding the vehicle are determined to impede driver visibility. The AR map may be generated using static map data, such as historical street-level views of the environment surrounding the moving vehicle, as well as dynamic road condition data, such as real-time traffic conditions. The AR may be updated continuously based on movement of the moving vehicle and changes in the dynamic road condition data. Thus, the AR map may provide a view of the environment surrounding the moving vehicle that is unobstructed by the conditions creating the impaired visibility, allowing the driver to continue to operate the moving vehicle in a safe manner. These and other examples of the present disclosure are discussed in great detail below in connection with FIGS. 1-5.

Figure 1:
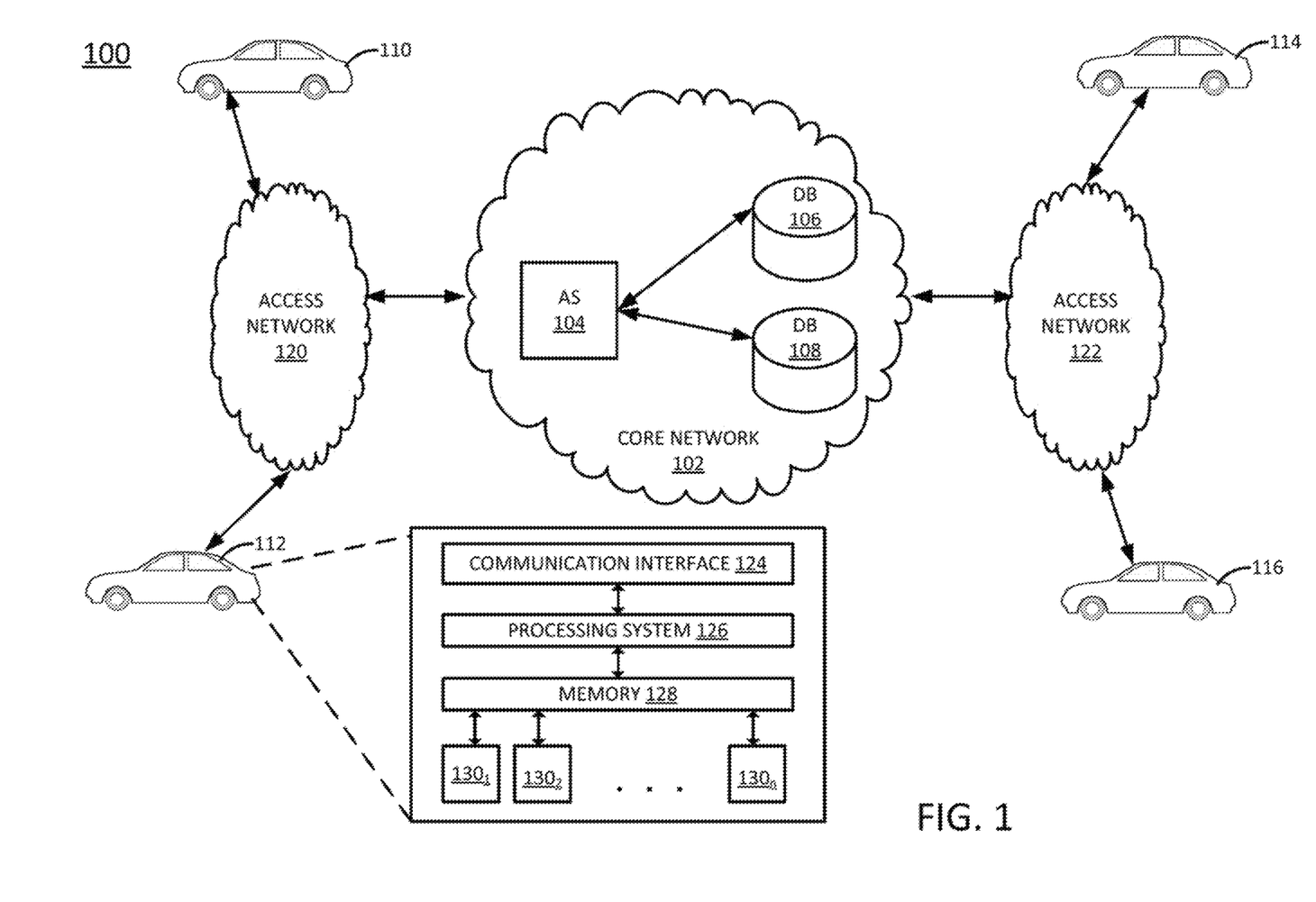
FIG. 1 illustrates an example system in which examples of the present disclosure for generating augmented reality maps to assist drivers in navigating driving conditions in which the drivers' visibility may be impaired may operate.

To further aid in understanding the present disclosure, FIG. 1 illustrates an example system 100 in which examples of the present disclosure for generating augmented reality maps to assist drivers in navigating driving conditions in which the drivers' visibility may be impaired may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 5:
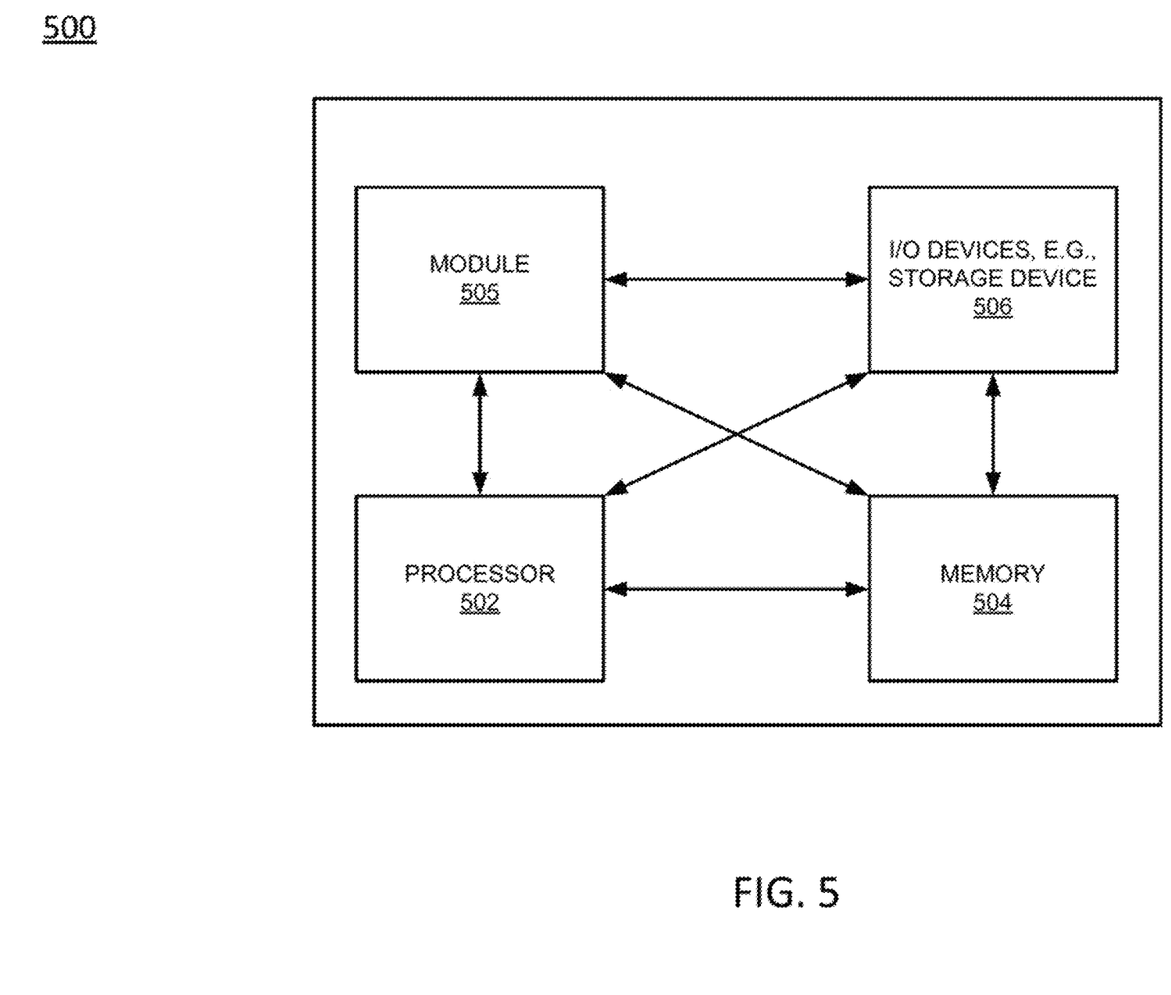
FIG. 5 depicts a high-level block diagram of a computing device specifically programmed to perform the functions described herein.

In accordance with the present disclosure, application server (AS) 104 may comprise a computing system or server, such as computing system 500 depicted in FIG. 5, and may be configured to provide one or more operations or functions for generating data for creating augmented reality views of an environment surrounding a moving vehicle, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

The AS 104 may be communicatively coupled to one or more databases (DBs) 106 and 108. The DBs 106 and 108 may store data that is used by the AS 104 to perform operations or functions for generating data for creating augmented reality views of an environment surrounding a moving vehicle, as described herein. For instance, the DB 106 may store outputs from the on-board sensors of a plurality of vehicles, while DB 108 may store historical map data including street level views of a plurality of locations. The DB 106 may be provided in connection with the AS 104 as part of a subscription service, while the DB 108 may be provided as part of the subscription service or may be provided by a party that is unaffiliated with or independent of the subscription service.

In a further example, AS 104 may comprise a physical storage device (e.g., a database server), to store various types of information in support of systems for generating data for creating augmented reality views of an environment surrounding a moving vehicle, in accordance with the present disclosure. For example, AS 104 may store any or all of the information stored by the DB 106 and/or DB 108.

Although only a single application server (AS) 104 and two databases (DBs) 106 and 108 are illustrated in FIG. 1, it should be noted that any number of servers and databases may be deployed. For instance, a plurality of servers and databases may operate in a distributed and/or coordinated manner as a processing system to perform operations for generating augmented reality maps to assist drivers in navigating driving conditions in which the drivers' visibility may be impaired, in accordance with the present disclosure. For ease of illustration, various additional elements of network 102 are omitted from FIG. 1.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in further communication with a plurality of user endpoint devices (UEs), such as devices 110 and 112. Similarly, access network 122 may be in further communication with a plurality of user endpoint devices (UEs), such as devices 114 and 116. In one example, UEs 110-116 may each comprise a motor vehicle (e.g., a connected car, van, truck, trailer, construction vehicle, bus, or the like), and the like. In further examples, the UEs 110-116 may comprise other types of vehicles such as connected watercraft, aircraft, and the like. By "connected," it is understood that the vehicle is capable of communicating bidirectionally with external systems (i.e., systems external to the vehicle, including the AS 104 and/or DBs 106 and 108).

FIG. 1 illustrates a view of the UE 112 in more detail. The more detailed view of the UE 112 may also be representative of the UEs 110, 114, and 116; however, it is understood that any of the UEs 110, 112, 114, and 116 may include components in addition to those illustrated in FIG. 1. In one example, each UE 110-116 may comprise at least a communication interface 124, a processing system 126, a memory 128, and one or more on-board sensors $130_1$-$130_n$ (hereinafter individually referred to as an "on-board sensor 130" or collectively referred to as "on-board sensors 130"). The processing system 126 may be in communication with both the communication interface 124 and the memory 128, while the memory 128 may be in communication with the on-board sensors 130.

The on-board sensors 130 may include one or more different types of sensors for monitoring different conditions in and around a vehicle. In one example, the on-board sensors 130 may include at least one of: a sound navigation ranging (sonar) system, a light detection and ranging (lidar) system, a radar system, a camera (e.g., RGB and/or infrared video camera) system, a global positioning system (GPS), a moisture sensor, a proximity sensor, a light sensor, a barometer, a thermometer, an anemometer, or another type of sensor. Each on the on-board sensors 130 may generate as an output measurements of a condition in or around the vehicle (e.g., on a continuous, periodic, or event-driven basis) and may store these measurements in the memory 128. In one example, measurements may remain in the memory 128 until the measurements reach a predefined age (e.g., z minutes) and/or until the measurements are overwritten by more recent measurements. The memory 128 may comprise volatile memory, non-volatile memory, read-only memory (ROM), random access memory (RAM), a magnetic or optical drive, a device or diskette, and/or any combination thereof.

The processing system 126 may comprise, in one example, an on-board computing system or controller of a vehicle (e.g., an electronic control unit (ECU) or an electronic control module (ECM)). The processing system 126 may retrieve measurements observed by the on-board sensors 130 from the memory 128 and may process the measurements in order to make inferences about the conditions surrounding the vehicle. For instance, if the measurements include camera images of the road ahead of the vehicle covered in heavy fog, then the processing system 126 may infer that the visibility of the vehicle's driver may be impaired. Similarly, if the measurements include outputs of a rainfall sensor indicating that a threshold rate of rainfall (e.g., x percentage of change in rainfall depth over time) is occurring outside of the vehicle, then the processing system 126 may infer that the visibility of the vehicle's driver may be impaired.

The communication interface 124 may comprise any type of interface to establish a wireless communication session with the access network 120 and core network 102. In one example, the communication interface 124 may be a wireless network card that can wirelessly connect to a local WIFI network. In one example, the communication interface may establish a communication session between the vehicle and the DB 106 in order to transmit measurements observed by the on-board sensors 130 from the memory 128 to the DB 106.

In a further example, when the processing system 126 infers that the visibility of the vehicle's driver is likely to be impaired by the conditions surrounding the vehicle, the communication interface 124 may establish a communication session between the vehicle and the AS 104 in order to acquire data to assist the processing system 126 in generating an AR view of the conditions surrounding the vehicle (e.g., a view that is free of any conditions that may impair the driver's visibility, such as fog, heavy rain or snow, smoke, or the like). This AR view may be displayed on a display inside the vehicle, such as a heads up display, a dashboard display, an AR-enabled windshield, or the like. Thus, the AR view may help the driver to safely navigate the vehicle despite the conditions.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth. Thus, these and other modifications are all contemplated within the scope of the present disclosure.

Figure 2:
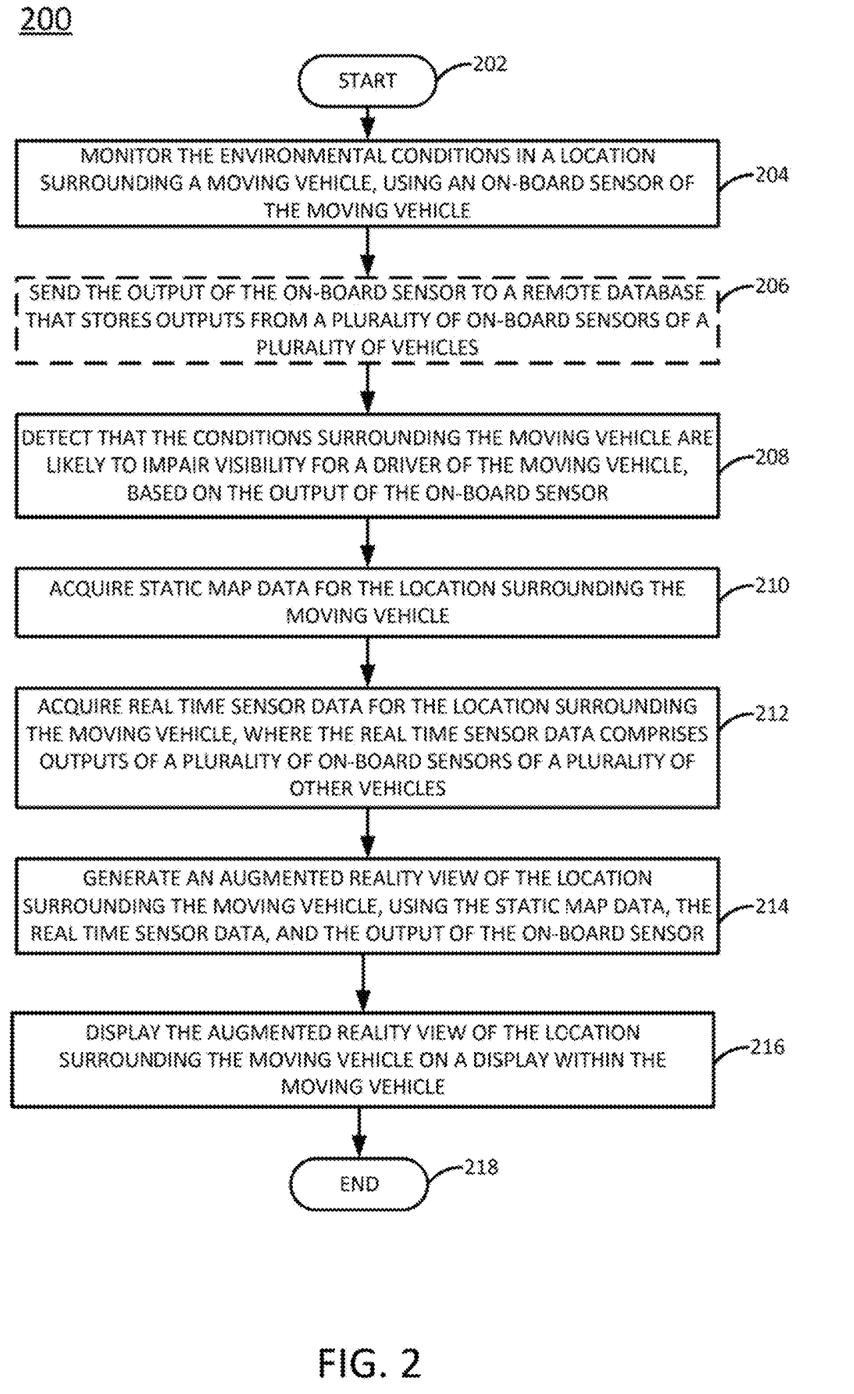
FIG. 2 illustrates a flowchart of an example method for generating augmented reality maps to assist drivers in navigating driving conditions in which the drivers' visibility may be impaired.

FIG. 2 illustrates a flowchart of an example method 200 for generating augmented reality maps to assist drivers in navigating driving conditions in which the drivers' visibility may be impaired. The steps, functions, or operations of the method 200 may be performed, for example, by the processing system of a vehicle, such as the processing system 126 illustrated in FIG. 1. In another example, the steps, functions, or operations of method 200 may be performed by a computing device or system 500, and/or processor 502 as described in connection with FIG. 5 below. Similarly, in one example, the steps, functions, and/or operations of the method 200 may be performed by a processing system comprising one or more computing devices collectively configured to perform various steps, functions, and/or operations of the method 200. For instance, multiple instances of the computing device or processing system 500 may collectively function as a processing system. For illustrative purposes, the method 200 is described in greater detail below in connection with an example performed by a processing system, such as processor 502.

The method 200 begins in step 202. In step 204, the processing system may monitor the environmental conditions surrounding a moving vehicle, using at least one on-board sensor of the moving vehicle.

In one example, the moving vehicle may include a plurality of on-board sensors that measure different environmental conditions of and around the moving vehicle and provide measurements of the different environmental conditions to the processing system. In one example, the on-board sensors may include at least one of: a sonar system, a lidar system, a radar system, a camera (e.g., RGB and/or infrared video camera) system, a GPS, a moisture sensor, a proximity sensor, a light sensor, a barometer, a thermometer, an anemometer, or another type of sensor. The measurements provided by any of these on-board sensors may be analyzed by the processing system in order to detect the presence and location of weather events, other objects (e.g., other vehicles, pedestrians, road obstructions, etc.), and the like, as discussed in greater detail below.

In optional step 206 (illustrated in phantom), the processing system may send the output of the on-board sensor to a remote database that stores outputs of a plurality of on-board sensors of a plurality of vehicles.

In one example, a remote database may collect measurements from the on-board sensors of a plurality of vehicles (which may include moving and non-moving vehicles), where each vehicle of the plurality of vehicles may include on-board sensors such as those described above. In one example, each measurement (including the output of the on-board sensor that is sent by the processing system) may include metadata identifying at least one of: a location at which the measurement was measured (e.g., GPS coordinates, longitude and latitude, highway exit markers, street names, zip codes, city, landmarks (e.g., bridges, tunnels, toll booths, railroad stations, and the like), or other positional identifiers), a time at which the measurement was measured, a vehicle from which the measurement was received (e.g., a unique identifier that identifies a single vehicle), and/or other information.

In one example, users may opt into sharing the outputs of their vehicles' on-board sensors with the remote database, e.g., as part of a subscription-based service. For instance, users may subscribe to a service whereby the users' vehicles are assigned unique identifiers. Subsequently, when the users are operating their vehicles, data measured by the on-board sensors of the vehicles may be marked with the vehicles unique identifiers and shared with the remote database. When necessary, data measured by the on-board sensors of other vehicles may be shared by the database with the vehicles, as discussed in greater detail below.

In step 208, the processing system may detect that the conditions surrounding the moving vehicle are likely to impair visibility for a driver of the moving vehicle, based on the output of the on-board sensor.

In one example, the processing may automatically detect that the conditions surrounding the moving vehicle are likely to impair visibility for the driver in response to the detection of at least one predefined condition in the output of the on-board sensor. For instance, a rainfall sensor may detect the presence of a predefined threshold rate of rainfall (e.g., x percentage of change in rainfall depth over time), a camera may detect a predefined threshold decrease in visibility (e.g., inability to identify objects located a threshold distance away with a threshold degree of confidence) caused by fog or snow, or the like.

In another example, the processing system may detect that the conditions surrounding the moving vehicle are likely to impair visibility for the driver in response to receiving a signal from a user (e.g., driver or passenger) of the moving vehicle. For instance, the user may press a button, speak a keyword, or otherwise provide a signal to let the processing system know that an AR view of the environment surrounding the moving vehicle is being requested.

In another example, the processing system may detect that the conditions surrounding the moving vehicle are likely to impair visibility for the driver in response to receiving an alert from a remote server or other devices. For instance, although the conditions currently surrounding the moving vehicle may not substantially impair driver visibility, the moving vehicle may be approaching a location at which the conditions are different (e.g., a location at which there is a fire producing large amounts of smoke, a localized heavy rain storm, a localized sand storm, a vehicular accident, or the like). In such a case, if the vehicle is inferred to be approaching the location at which the conditions are different (e.g., based on a destination programmed into a navigation system, on current direction of travel, or the like), then a server or another device that is aware of the conditions and of the moving vehicle's location and/or inferred route may transmit an alert to the moving vehicle.

In step 210, the processing system may acquire static map data for the location surrounding the moving vehicle.

In one example, the static map data may be obtained from a remote server (e.g., a map generation server). For instance, the remote server may retrieve the static map data from one or more databases, where each database of the one or more databases may be operated by a different entity (e.g., a commercial entity, a governmental entity, an educational entity, or the like). In one example, the static map data stored in the databases may comprise maps and/or images of a plurality of locations, where the static map data does not change substantially over time. For instance, the static map data may comprise historical street level views or images of the location surrounding the moving vehicle.

In step 212, the processing system may acquire real time sensor data for the location surrounding the moving vehicle, where the real time (e.g., dynamic) sensor data comprises outputs of a plurality of on-board sensors of a plurality of other vehicles (i.e., vehicles other than the moving vehicle). In one embodiment, it should be noted that "real time" sensor data may comprise "near real time" sensor data relative to the perspective of a current vehicle, e.g., within a predefined amount of time occurring before the current time. For example, an earlier vehicle travelling on the same roadway ahead of a current vehicle (e.g., one minute ahead, two minutes ahead, five minutes ahead, and so on). Alternative, in another embodiment, the other vehicles may simply be other vehicles traveling alongside a current vehicle, but these other vehicles may have a slightly different locations (i.e., different perspectives) relative to the current vehicle (e.g., in neighboring lanes on a multi-lane highway, etc.), where "real time" sensor data can be acquired (e.g., images from a vehicle travelling on a local lane may reveal an accident ahead more clearly than images taken from a vehicle travelling on an express lane).

In one example, the real time sensor data may be acquired from the remote server from which the static map data was obtained in step 210. For instance, the remote server may retrieve the real time sensor data from a remote database, such as the database to which the processing system sent the on-board sensor output in step 206. As discussed above, the real time sensor data stored in the remote database may comprise on-board sensor data collected from a plurality of vehicles, where the real time sensor data may change continuously over time. For instance, the real time sensor data may comprise data indicative of weather conditions (e.g., precipitation, wind, or the like), traffic conditions (e.g., accidents, construction sites, obstructions, or the like), or other conditions. The real time sensor data may be associated with metadata indicating when and where the real time sensor data was measured or collected. In some examples, real time sensor data may age out of the remote database after a threshold period of time. For instance, all real time sensor data may be automatically deleted from the remote database after z minutes, e.g., z may be 5 minutes, 10 minutes, 15 minutes, etc. The real time sensor data may, however, continually be replaced in the remote database with more recent real time sensor data.

In another example, the real time sensor data may be obtained directly from the plurality of vehicles. For instance, direct vehicle-to-vehicle communications may allow vehicles to share their respective real time sensor data directly, decreasing the latency with which the real time sensor data is acquired by the processing system.

In step 214, the processing system may generate an augmented reality view of the location surrounding the moving vehicle, using the static map data, the real time sensor data, and the output of the on-board sensor.

In one example, the augmented reality view may comprise a view of the location surrounding the moving vehicle that is free of the conditions that were determined to be likely to impair visibility for the driver of the moving vehicle. For instance, the augmented reality view may present a video image of the road ahead of the moving vehicle, where the video image may be digitally altered to remove conditions that are likely to impair visibility. As an example, if the moving vehicle is driving through an area of heavy fog, the augmented reality view may comprise a video image of the road ahead of the moving vehicle, but without the fog. This may help the driver to navigate the moving vehicle through the area of heavy fog, even though the driver's visibility may be impaired.

In step 216, the processing system may display the augmented reality view of the location surrounding the moving vehicle on a display within the moving vehicle.

Figure 3A:
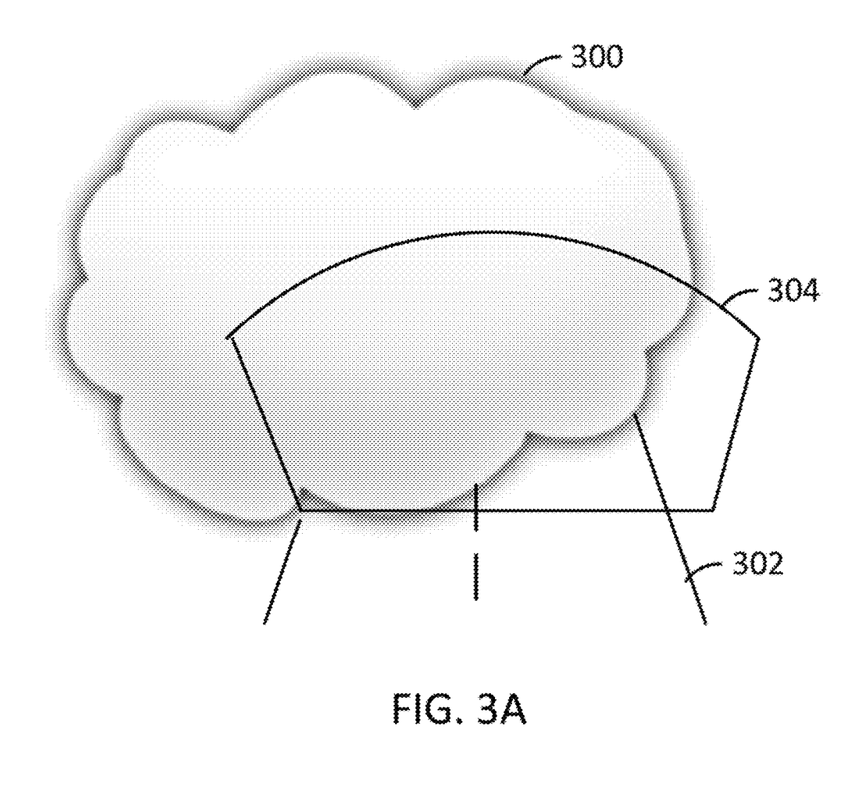
FIG. 3A illustrates an example in which there is heavy fog ahead of a car, obscuring visibility of a part of the road through the car's windshield.
Figure 3B:
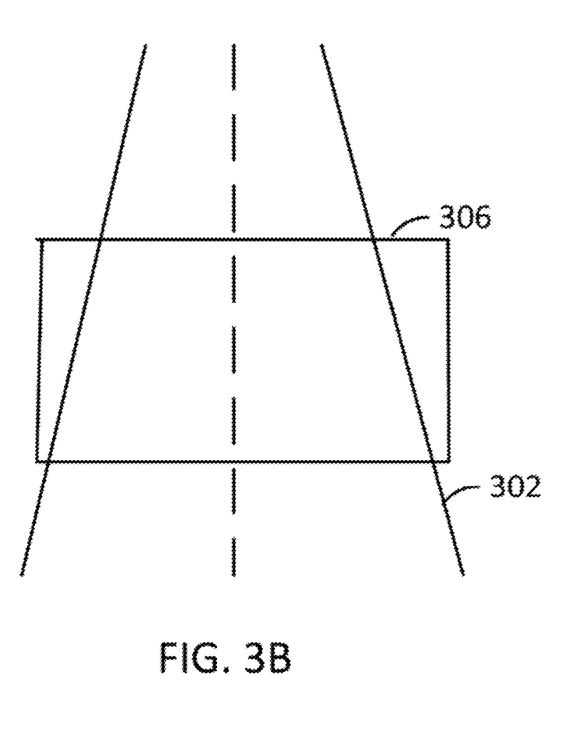
FIG. 3B illustrates an augmented reality view of the road of FIG. 3A, in which the fog may be digitally removed so that the road is fully visible.

For instance, the moving vehicle may include a heads up display, a dashboard display, an AR-enabled windshield, or another type of display on which the AR view may be displayed to the driver of the moving vehicle. As discussed above, this may help the driver to navigate the moving vehicle through the conditions that are impairing visibility. FIG. 3A, for instance, illustrates an example in which there is heavy fog 300 ahead of a car, obscuring visibility of part of the road 302 through the car's windshield 304. FIG. 3B illustrates an AR view 306 of the road 302 of FIG. 3A, in which the fog 300 may be digitally removed so that the road 302 is fully visible. The AR view 306 may be displayed on a display within the car, as discussed above.

Steps 204-216 may be repeated as necessary, e.g., such that the AR view continually presents a modified view of the road ahead of the moving vehicle until the conditions surrounding the moving vehicle change to allow improved visibility, until the moving vehicle reaches a destination programmed into a navigation application, until the engine of the moving vehicle is shut off, until a user of the moving vehicle requests that the AR view be turned off, or until another predefined event is detected to have occurred.

The method 200 may end in step 218.

Figure 4:
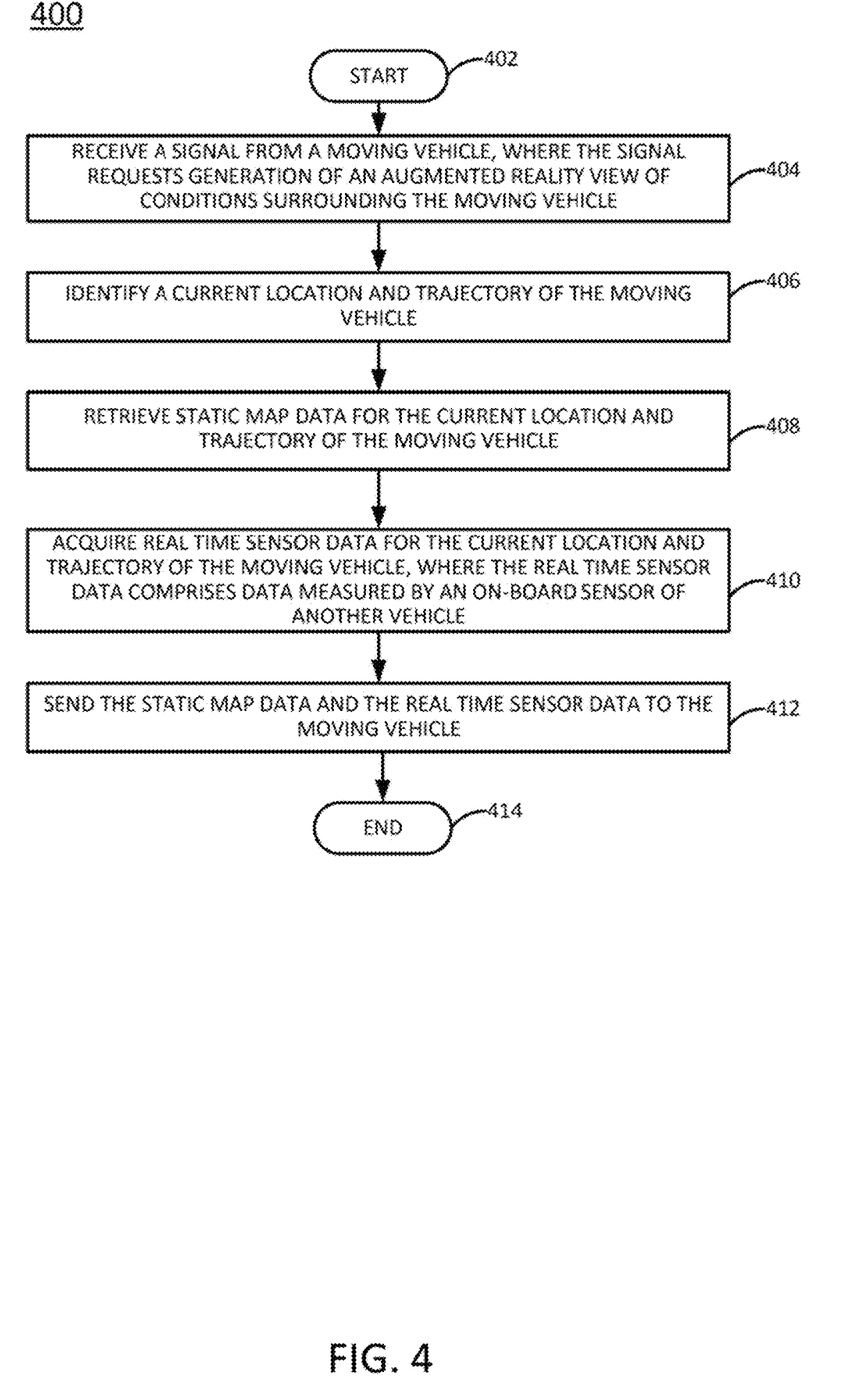
FIG. 4 illustrates a flowchart of an example method for generating augmented reality maps to assist drivers in navigating driving conditions in which the drivers' visibility may be impaired.

FIG. 4 illustrates a flowchart of an example method 400 for generating augmented reality maps to assist drivers in navigating driving conditions in which the drivers' visibility may be impaired. The steps, functions, or operations of the method 400 may be performed, for example, by an application server, such as the AS 104 illustrated in FIG. 1. In another example, the steps, functions, or operations of method 400 may be performed by a computing device or system 500, and/or processor 502 as described in connection with FIG. 5 below. Similarly, in one example, the steps, functions, and/or operations of the method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system, such as processor 502.

The method 400 begins in step 402. In step 404, the processing system may receive a signal from a moving vehicle, where the signal requests generation of an augmented reality view of conditions surrounding the moving vehicle. Alternatively, the signal may request the pertinent data to allow the moving vehicle itself to generate the augmented reality view of conditions surrounding the moving vehicle.

As discussed above, the processing system of a moving vehicle may automatically request generation of an AR view when the processing system detects that the conditions surrounding the moving vehicle are likely to impair visibility for the driver of the moving vehicle. In another example, the processing system of the moving vehicle may proactively request generation of an AR view when the processing system of the moving vehicle infers (e.g., based on data from another data source, such as another vehicle, a news feed, an emergency alert, or a weather forecasting application) that the moving vehicle will soon enter conditions in which the visibility may be impaired for the driver. In another example, a user (e.g., the driver or a passenger) of the moving vehicle may request the AR view.

In step 406, the processing system may identify a current location and trajectory of the moving vehicle. In one example, the current location and trajectory of the moving vehicle may be included in the request received in step 406. For instance, metadata associated with the request may indicate the current location (e.g., GPS coordinates, longitude and latitude, highway exit markers, street names, zip codes, city, landmarks, or other positional identifiers) of the moving vehicle and the moving vehicle's trajectory (e.g., a path to a destination that has been programmed into a navigation application, a predefined distance ahead on a road currently traveled by the moving vehicle, etc.).

In another example, the processing system may identify the current location and trajectory of the moving vehicle by first identifying the moving vehicle. For instance, if the moving vehicle is subscribed to an AR mapping service, then the moving vehicle may be associated with a unique account number or other vehicle identifiers. The vehicle identifier may be used as an index to a database that stores real time sensor data for a plurality of vehicles subscribed to the AR mapping service. For instance, each instance of real time sensor data stored in the database may be tagged with metadata to indicate the source of the instance of real time sensor data. The processing system may search the database for instances of real time sensor data for which the source is the moving vehicle, and may then identify from among those instances that real time sensor data that was recorded most recently in the database (e.g., has the most recent timestamp). This may give an approximation of the current location and trajectory of the moving vehicle by first identifying the moving vehicle.

In step 408, the processing system may retrieve static map data for the current location and trajectory of the moving vehicle.

In one example, the processing system may use the current location and trajectory of the moving vehicle (determined in any of the ways discussed above) as an index into a database that stores maps and/or images of a plurality of locations, where the static map data does not change substantially over time. For instance, the static map data may comprise historical street level views or images of the location surrounding the moving vehicle. The processing system may search the database for any static map data that is tagged with metadata that matches the current location and trajectory of the moving vehicle.

In step 410, the processing system may acquire real time sensor data for the current location and trajectory of the moving vehicle, where the real time sensor data comprises data measured by an on-board sensor of another vehicle.

In one example, the processing system may use the current location and trajectory of the moving vehicle (determined in any of the ways discussed above) as an index into a database that stores real time sensor data for a plurality of vehicles subscribed to the AR mapping service. For instance, each instance of real time sensor data stored in the database may be tagged with metadata to indicate the location at which the real time sensor data was recorded. The processing system may search the database for instances of real time sensor data for which the location matches the current location or the trajectory of the moving vehicle.

In step 412, the processing system may send the static map data and the real time sensor data to the moving vehicle. Alternatively, in one embodiment the processing system may generate and then send the augmented reality view of conditions surrounding the moving vehicle to the moving vehicle. In other words, in one embodiment, the augmented reality view of conditions surrounding the moving vehicle can be generated externally from the moving vehicle and then transmitted to the moving vehicle. Such embodiment can be achieved if there is sufficient transmission bandwidth between the moving vehicle and the application server.

As discussed above, a processing system of the moving vehicle may use the static map data and the real time sensor data to generate an AR view of the environment surrounding the moving vehicle, where the AR view may digitally remove any conditions which may impair visibility for the driver of the moving vehicle.

Steps 406-412 may be repeated as necessary, e.g., such that the processing system continually sends updated static map data and real time sensor data to the moving vehicle based on the movement of the moving vehicle, allowing the processing system of the moving vehicle to continually present a modified view of the road ahead of the moving vehicle until the conditions surrounding the moving vehicle change to allow improved visibility, until the moving vehicle reaches a destination programmed into a navigation application, until the engine of the moving vehicle is shut off, until a user of the moving vehicle requests that the AR view be turned off, or until another predefined event is detected to have occurred.

The method 400 may end in step 414.

Although not expressly specified above, one or more steps of the method 200 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 of FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device specifically programmed to perform the functions described herein. For example, any one or more components or devices illustrated in FIG. 1 or described in connection with the method 200 or method 400 may be implemented as the system 500. For instance, a connected vehicle or an application server could be implemented as illustrated in FIG. 5.

As depicted in FIG. 5, the system 500 comprises a hardware processor element 502, a memory 504, a module 505 for generating augmented reality maps to assist drivers in navigating driving conditions in which the drivers' visibility may be impaired, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for generating augmented reality maps to assist drivers in navigating driving conditions in which the drivers' visibility may be impaired may include circuitry and/or logic for performing special purpose functions relating to generating augmented reality maps. The input/output devices 506 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, a display, an on-board sensor, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for generating augmented reality maps to assist drivers in navigating driving conditions in which the drivers' visibility may be impaired (e.g., a software program comprising computer-executable instructions) can be loaded into memory 504 and executed by hardware processor element 502 to implement the steps, functions or operations as discussed above in connection with the example method 200 or example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for generating augmented reality maps to assist drivers in navigating driving conditions in which the drivers' visibility may be impaired (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
   monitoring, by a processing system including at least one processor, environmental conditions surrounding a moving vehicle, using an on-board sensor of the moving vehicle;
   detecting, by the processing system, that at least one of the environmental conditions surrounding the moving vehicle is likely to impair visibility for a driver of the moving vehicle, based on an output of the on-board sensor;
   acquiring, by the processing system, static map data for a location surrounding the moving vehicle;
   acquiring, by the processing system, real time sensor data for the location surrounding the moving vehicle, where the real time sensor data comprises outputs of a plurality of on-board sensors of a plurality of other vehicles;
   generating, by the processing system, an augmented reality view of the location surrounding the moving vehicle, using the static map data, the real time sensor data, and the output of the on-board sensor; and
   displaying, by the processing system, the augmented reality view of the location surrounding the moving vehicle on a display within the moving vehicle.

2. The method of claim 1, wherein the on-board sensor comprises at least one of: a sonar system, a lidar system, a radar system, a camera system, a global positioning system, a moisture sensor, a proximity sensor, a light sensor, a barometer, a thermometer, or an anemometer.

3. The method of claim 1, wherein the detecting is in response to a detection of a predefined condition in the output of the on-board sensor.

4. The method of claim 1, wherein the detecting is in response to receiving a signal from a user of the moving vehicle.

5. The method of claim 1, wherein the detecting is in response to receiving an alert from a remote server.

6. The method of claim 1, wherein the static map data comprises historical street level views or images of the location surrounding the moving vehicle.

7. The method of claim 1, wherein the real time sensor data for the location surrounding the moving vehicle comprises at least one of: data indicative of weather conditions or data indicative of traffic conditions.

8. The method of claim 1, wherein the real time sensor data is acquired directly from the plurality of other vehicles.

9. The method of claim 1, wherein real time sensor data is acquired from a remote server in communication with a database that receives the real time sensor data from the plurality of other vehicles.

10. The method of claim 1, wherein the augmented reality view of the location surrounding the moving vehicle comprises a view of the location surrounding the moving vehicle that is free of the at least one of the environmental conditions that was determined to be likely to impair visibility for the driver of the moving vehicle.

11. The method of claim 1, wherein the augmented reality view of the location surrounding the moving vehicle comprises a video image of a road ahead of the moving vehicle in which the at least one of the environmental conditions is digitally removed.

12. The method of claim 1, wherein the display comprises at least one of: a heads up display, a dashboard display, or an augmented reality-enabled windshield.

13. The method of claim 1, further comprising:
sending, by the processing system, the output of the on-board sensor to a remote database that stores outputs of a plurality of on-board sensors of a plurality of vehicles.

14. The method of claim 13, wherein each output of the outputs of the plurality of on-board sensors is associated with metadata that indicates a location at which the each output was recorded.

15. The method of claim 13, wherein each output of the outputs of the plurality of on-board sensors is associated with metadata that indicates a time at which the each output was recorded.

16. The method of claim 15, wherein the each output is automatically deleted from the remote database when an age of the each output, as indicated by the time at which the each output was recorded, is greater than a predefined threshold.

17. The method of claim 13, wherein the plurality of on-board sensors of the plurality of vehicles include at least one of: a sonar system, a lidar system, a radar system, a camera system, a global positioning system, a moisture sensor, a proximity sensor, a light sensor, a barometer, a thermometer, or an anemometer.

18. The method of claim 1, further comprising:
repeating the monitoring, the detecting the acquiring the static map data, the acquiring the real time sensor data, the generating, and the displaying until an occurrence of a predefined event is detected.

19. A non-transitory computer-readable storage medium storing instructions which, when executed by a processing system including at least one processor, cause the processing system to perform operations, the operations comprising:
monitoring environmental conditions surrounding a moving vehicle, using an on-board sensor of the moving vehicle;
detecting that at least one of the environmental conditions surrounding the moving vehicle is likely to impair visibility for a driver of the moving vehicle, based on an output of the on-board sensor;
acquiring static map data for a location surrounding the moving vehicle;
acquiring real time sensor data for the location surrounding the moving vehicle, where the real time sensor data comprises outputs of a plurality of on-board sensors of a plurality of other vehicles;
generating an augmented reality view of the location surrounding the moving vehicle, using the static map data, the real time sensor data, and the output of the on-board sensor; and
displaying the augmented reality view of the environment surrounding the moving vehicle on a display within the moving vehicle.

20. A system comprising:
a processing system including at least one processor; and
a non-transitory computer-readable medium storing instructions which, when executed by the processing system, cause the processing system to perform operations, the operations comprising:
monitoring environmental conditions surrounding a moving vehicle, using an on-board sensor of the moving vehicle;
detecting that at least one of the environmental conditions surrounding the moving vehicle is likely to impair visibility for a driver of the moving vehicle, based on an output of the on-board sensor;
acquiring static map data for a location surrounding the moving vehicle;
acquiring real time sensor data for the location surrounding the moving vehicle, where the real time sensor data comprises outputs of a plurality of on-board sensors of a plurality of other vehicles;
generating an augmented reality view of the location surrounding the moving vehicle, using the static map data, the real time sensor data, and the output of the on-board sensor; and
displaying the augmented reality view of the location surrounding the moving vehicle on a display within the moving vehicle.

* * * * *